(12) United States Patent
Baseman et al.

(10) Patent No.: US 7,363,259 B2
(45) Date of Patent: Apr. 22, 2008

(54) VALUE-BASED FRAMEWORK FOR INVENTORY MANAGEMENT

(75) Inventors: Robert Baseman, Brewster, NY (US); Thomas R. Ervolina, Hopewell Junction, NY (US); William Grey, Millwood, NY (US); Kaan Katircioglu, Peeskill, NY (US)

(73) Assignee: International Business Machines Corporation, Armonk, NY (US)

( * ) Notice: Subject to any disclaimer, the term of this patent is extended or adjusted under 35 U.S.C. 154(b) by 1597 days.

(21) Appl. No.: 09/731,772

(22) Filed: Dec. 8, 2000

(65) Prior Publication Data

US 2002/0147666 A1    Oct. 10, 2002

(51) Int. Cl.
*G06Q 10/00* (2006.01)
(52) U.S. Cl. ..................................... 705/28
(58) Field of Classification Search ............... 705/7, 705/8, 10, 28, 36, 29, 36 R
See application file for complete search history.

(56) References Cited

U.S. PATENT DOCUMENTS

| | | | | |
|---|---|---|---|---|
| 5,450,317 A | * | 9/1995 | Lu et al. ............... | 705/28 X |
| 5,615,109 A | * | 3/1997 | Eder ..................... | 705/8 |
| 5,761,442 A | * | 6/1998 | Barr et al. ............. | 705/36 |
| 5,930,762 A | * | 7/1999 | Masch .................. | 705/7 |
| 5,963,919 A | * | 10/1999 | Brinkley et al. ...... | 705/28 |
| 6,393,406 B1 | * | 5/2002 | Eder ..................... | 705/7 |

OTHER PUBLICATIONS

Herbert Scarf in "The Optimality of (s,S) Policies in the Dynamic Inventory Problem", Mathematical Methods in the Social Sciences, (Eds. Arrow, Karlin, Suppes), Stanford University Press, 1959, pp. 196-202.

D. L Iglehart in "The Dynamic Inventory Problem with Unknown Distributions of Demand", Management Science 10, (1964) pp. 429-440.

R. Erhardt in "The Power Approximation for Computing (S,s) Inventory Policies", Management Science, 25, (1979) pp. 777-786.

Y.S. Zheng and A. Federgruen in "Finding Optimal (s,S) Policies is About as Simple as Evaluating a Single Policy", Operations Research, 39, 4, (1992), pp. 654-665.

(Continued)

*Primary Examiner*—Gerald J. O'Connor
(74) *Attorney, Agent, or Firm*—Whitham, Curtis, Christofferson & Cook, PC; Stephen C. Kaufman

(57) ABSTRACT

A value-based framework is used for managing inventory. This framework allows firms to set risk and return targets for inventory related capital investments and operational management. A set of possible inventory investments is generated, and a value of possible inventory investments is then computed. The value of possible inventory investments is computed by first decomposing cash flows associated with the inventory investment into a combination of cash flows that can be represented by a portfolio comprised of long and short positions in an underlying asset. Then a valuation methodology is used to compute the value of each long and short position in the portfolio. The values of each long and short position in the portfolio is summed to determine a value of the portfolio. The value of the inventory investment is set equal to the value of the portfolio. An inventory investment with a best value is selected.

12 Claims, 2 Drawing Sheets

OTHER PUBLICATIONS

H. I. Lee and S. Namias, "Single-Product, Single-Location Models", Logistics of Production and Inventory, Handbooks in Operations Research and Management Science, S.C., Graves, H.G. Rinnooy Kan, and P.H. Zipkin (Eds.), vol. 4, North-Holland, Amsterdam (1993).

Leroy B. Schwarz et al., "Fill Rate Optimization in a One-Warehouse N-Identical Retailer Distribution System", Management Sciences, Apr. 1985, vol. 31, No. 4, pp. 488-498.

Ralph D. Badinelli and Leroy B. Schwarz, "Backorders Optimization in a One-Warehouse N-Identical Retailer Distribution System", Naval Research Logistics, vol. 35, pp. 427-440 (1988).

* cited by examiner

VALUE-BASED FRAMEWORK FOR INVENTORY MANAGEMENT

BACKGROUND OF THE INVENTION

1. Field of the Invention

The present invention generally relates to inventory management and, more particularly, to a value-based framework for inventory management that enables companies to calculate optimal inventory quantities using financial tools usually used to manage a portfolio of financial instruments.

2. Background Description

Inventory management is a well-established discipline both in the academic and business world. The methodologies and techniques are also well known. The common objective of widely used methods is typically to minimize inventory related costs or achieve a pre-specified customer serviceability target within a budget. It can also be profit or revenue maximization. In general, one can classify inventory management problems into two categories: deterministic demand, and stochastic demand. In both categories there are well known models that have been developed over the years. For instance, the method of MRP (Material Requirements Planning) is an example of deterministic inventory planning. MRP is used in relatively more complicated manufacturing and distribution systems and therefore, in order to simplify the planning process, future demand is typically assumed to be a known quantity. An example to the second category is the (S,s) inventory model where an order of Q=S−s is placed when inventory position (inventory on hand+on order− demand backlogs) drops to s. Optimality of (S,s) policies were proven by Herbert Scarf in "The Optimality of (s,S) Policies in the Dynamic Inventory Problem", *Mathematical Methods in the Social Sciences*, (Ed.), Arrow, Karlin, Suppes, Stanford University Press, (1959), pp. 196-202, and later by D. L. Iglehart in "The Dynamic Inventory Problem with Unknown Distributions of Demand", *Management Science*, 10, (1964), pp. 429-440, under more general conditions. Since then, (S,s) policies have received a lot of attention from researchers in both industry and academia. Practical implementation of (S,s) policies are facilitated by R. Ehrhardt in "The Power Approximation for Computing (S,s) Inventory Policies", *Management Science*, 25, (1979), pp. 777-786, and more recently by Y. S. Zheng and A. Federgruen in "Finding Optimal (s,S) Policies Is About as Simple as Evaluating a Single Policy", *Operations Research*, 39, 4, (1992), pp. 654-665. A collection of inventory models in advanced distribution systems can be found in L. B. Schwartz, *Multi-Level Production/Inventory Control Systems: Theory and Practice*, North-Holland, Amsterdam, (1981). For a more focused analysis of single-product, single-facility inventory systems, see H. L. Lee and S. Nahmias, "Single-Product, Single-Location Models", *Logistics of Production and Inventory, Handbooks in Operations Research and Management Science*, S. C. Graves, H. G. Rinnooy Kan, and P. H. Zipkin (Eds.), vol. 4, North-Holland, Amsterdam, (1993).

Well established inventory replenishment methods such as the (S,s) inventory model are widely used across industries, most typically for retail, wholesale and manufacturing environments. The general focus of these methods is to calculate optimal inventory levels so as to meet customer serviceability objectives and/or financial objectives such as maximizing profit or revenue or minimizing cost. or revenue or minimizing cost.

Inventory management is perceived to be a different problem than financial risk management in company practice today. However, one can draw a parallel between inventory management and asset portfolio management and, using this parallel, one can put inventory management into a financial management perspective.

SUMMARY OF THE INVENTION

It is therefore an object of the present invention to enable firms to use existing financial asset portfolio management tools to manage their inventory.

This invention enables companies to calculate optimal inventory quantities using a technology that already exists in the field of finance. It expresses a large class of inventory problems as a combination of long and short positions and put and call options on an asset. In doing so, it opens the door for using financial tools that are available to manage portfolios of these financial instruments.

According to the invention, firms can set risk and return targets for inventory related capital investments and for operational management of their inventories. This allows a firm to put its inventory management within the framework of its quarterly, annual or long term financial objectives. As a result of this methodology, firms can position themselves more accurately vis-a-vis their financial goals. Because this will reduce uncertainty of achieving financial goals, it will positively impact the market value of a firm. This invention enables firms to use well established portfolio management tools that are developed in the finance industry in managing their inventory. Namely, they can calculate optimal inventory quantities that can achieve their revenue (profit) targets with an acceptable revenue (profit) risk. Alternatively, they can calculate optimal inventory policy that can minimize their revenue (profit) risk with an acceptable expected revenue (profit) target.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Problem Formulation

Figure 1:
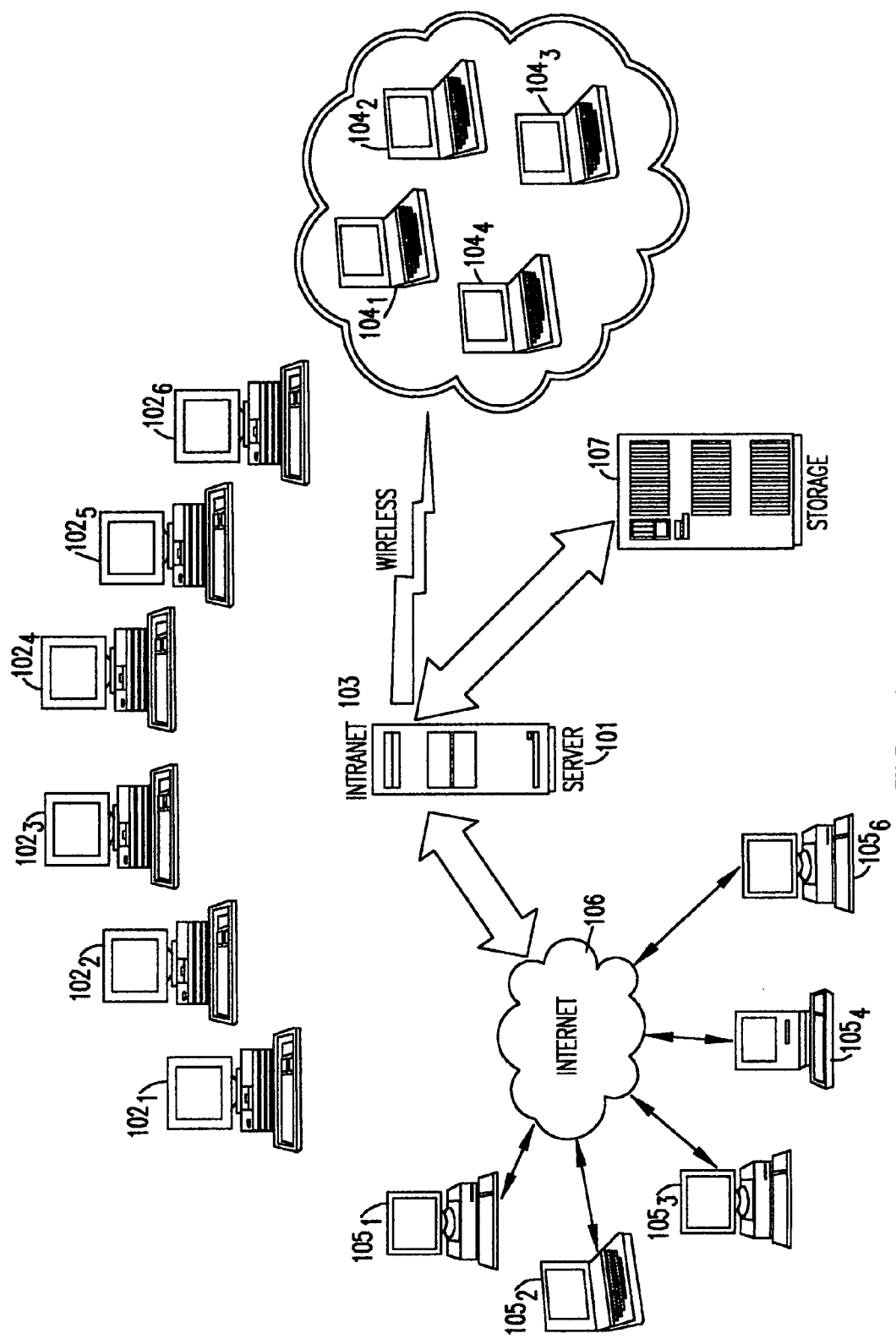
FIG. 1 is an illustration of a computer system architecture on which the invention may be implemented.

We will look at a simple tradeoff that typically appears in many inventory problems. We will formulate the problem and illustrate that it can be modeled as an options portfolio problem. Then, we will illustrate the benefit of the portfolio approach in an example.

Assume there are n products. Subscript i denotes a product (or an asset). We will use the following notation:

$D_i$: Demand during the Period, for product i (price of asset i at the end of the period).

$Q_i$: Supply quantity for product i (both put and call option strike price for asset i).

$h_i$: Holding cost for inventory at the end of the period (number of asset i based put options purchased).

$b_i$: Backlogging cost of demand at the end of the period (number of asset i based call options purchased).

$p_i$: Selling price for product i.

$c_i$: Purchase price for product i.

$s_i$: Salvage value for unsold product i.

Q, h, b: Vectors of $Q_i$'s, $h_i$'s, $b_i$'s, respectively (i=1, ... ,n).

$C_i(x)$: Cost of supplying x units of product i at the end of period (combined value of $h_i$ type i put options and $b_i$ type i call options with strike price x at the end of the period).

$EC_i(x)$: Expected value of $C_i(x)$.

σ: Target inventory risk or standard deviation of total inventory cost.

β: Target cost of inventory or expected value of total inventory cost.

For real numbers x and y, we define $(x-y)^+=\max(0, x-y)$. The expected cost of holding a supply of $Q_i$ for product i is $$EC_i(Q_i)=b_i E(D_i-Q_i)^+ + h_i E(Q_i-D_i)^+ \quad (1)$$

The objective from typical inventory management point of view would be solve the following problem:

$$\text{Min}_Q \Sigma_i EC_i(Q_i). \quad (2)$$

Problem (2) refers to calculating supply quantity vector Q that minimizes the expected cost of backlogging and inventory. There can be different variations of this problem. Below are some examples.

$$\text{Min}_Q \Sigma_i h_i E(Q_i-D_i)^+ \text{ subject to Prob}(D_i<Q_i)>p_i \text{ for all } i=1,2,\ldots,n. \quad (2.a)$$

$$\text{Min}_Q \Sigma_i h_i E(Q_i-D_i)^+ \text{ subject to } \Sigma_i \text{Prob}(D_i<Q_i)/n>p. \quad (2.b)$$

$$\text{Max}_Q \Sigma_i \text{Prob}(D_i<Q_i) \text{ subject to } \Sigma_i h_i E(Q_i-D_i)^+ <B. \quad (2.c)$$

In these variations "Prob" means probability. Problem (2.a) refers to calculating quantity vector Q that minimizes cost of inventory so as to satisfy demand with no less than a certain probability for each product. Problem (2.b) has the same objective so as to achieve a certain average customer service level for all products. Problem (2.c) maximizes average customer service within a budget constraint.

Now, we will express these problems as a combination of put and call options. A call option gives its owner the right to buy an asset at a pre-specified price. A put option gives its owner the right to sell an asset at a pre-specified price. These options have a last exercise date beyond which they are worthless and therefore require the owners to exercise their rights that they are entitled to before this date. It is optional to exercise the right and there is no penalty for not exercising.

Let S be the pre-specified strike price of an option (strike price). Let P be the price of the underlying asset at a future point in time. Here, P is a random variable, and therefore the value of the option is a random variable given by $(P-S)^+$ for call options, and $(S-P)^+$ for put options.

Notice that equation (1) consists of similar terms. Shortage quantity $(D_i-Q_i)^+$ corresponds to the value of a call option at a strike price of $Q_i$ and asset price of $D_i$. Similarly, inventory quantity $(Q_i-D_i)^+$ corresponds to a put option at a strike price of $Q_i$ and asset price of $D_i$. Therefore, equation (1) can be seen as the total expected value of a portfolio of put and call options. Notice that problem (2) is equivalent to the following problem:

$$\text{Max}_Q -\Sigma_i b_i E(D_i-Q_i)^+ - \Sigma_i h_i E(Q_i-D_i)^+. \quad (3)$$

This problem can be interpreted as a portfolio optimization problem in finance. The objective here is to determine the best strike prices ($Q_i$) that maximizes the expected value of a portfolio of put and call options given that we have $b_i$ call options and $h_i$ put options for asset i in the portfolio.

Notice that the term $\text{Prob}(D_i<Q_i)$ in financial context means the probability that a call option of strike price $Q_i$ will expire worthless, or a put option of strike price $Q_i$ will be exercised. Therefore, $\Sigma_i \text{Prob}(D_i<Q_i)/n$ can be taken as a measure of portfolio risk because it is the probability that put options will be exercised (i.e., claimed on the portfolio).

We will give another example. The profit function in the Newsboy problem, which is well known in inventory control theory (see Herbert Scarf, supra, page 297), is given by $$P=p(D-(D-Q)^+)+s(Q-D)^+-cQ. \quad (4)$$

The first term in the equation is the total revenue (where p is price per item) when the total demand is D units. The second term is the total salvage value from unsold inventory (where s is salvage value per item), and the last term is the total purchase cost of Q items (where c is the price of an item).

This is equivalent to the value of a portfolio that consist of (p−c) units of long position on an asset, (p−c) units of short position on a call option of strike price Q, and (c−s) units of short position on a put option of strike price Q.

Typically, there are multiple products, and therefore the problem to solve is $$\text{Max}_Q \Sigma_i P_i(Q_i)=\Sigma_i ((p_i-c_i)D_i-(p_i-c_i)(D_i-Q_i)^+-(c_i-s_i)(Q_i-D_i)^+). \quad (5)$$

This is equivalent to maximizing the value of a portfolio that has a covered call and a put on each of the assets i=1,2, ... , n. The objective is to calculate the best set of strike prices ($Q_i$) that maximizes expected value of the portfolio given that the portfolio should have $(p_i-c_i)$ units of covered calls and (c−s) units of short position on puts for asset i.

Because optimizing a portfolio of financial instruments such as assets and derivatives has been well established practice in finance and because there are tools available for this purpose, these tools can also be used to optimize inventory problems using our conversion methodology.

This approach can be applied to all inventory problems where individual terms in the objective function(s) and constraint(s) can be expressed as asset or derivative values.

Table 1 shows a small example that uses Monte Carlo approach to calculate the inventory quantities that maximizes expected profit. Because this is an illustration, sample size is only 30. The same model can be used with a large sample size to make Monte Carlo simulation results more accurate in practice. The example has ten products with different prices, costs and salvage values as well as different demand distributions. Optimal inventory quantities as well as profit associated with the demand sample shown in the table are calculated.

TABLE 1

Illustration of Monte Carlo approach in calculating optimal quantities
and expected profit in multi-product inventory management problem.

| Product | 1 | 2 | 3 | 4 | 5 | 6 | 7 | 8 | 9 | 10 |
|---|---|---|---|---|---|---|---|---|---|---|
| Price (p) | $10.00 | $15.00 | $20.00 | $25.00 | $30.00 | $35.00 | $40.00 | $45.00 | $50.00 | $55.00 |
| Profit Margin | 10% | 12% | 14% | 16% | 18% | 20% | 22% | 24% | 26% | 28% |
| Cost (c) | $9.00 | $13.20 | $17.20 | $21.00 | $24.60 | $28.00 | $31.20 | $34.20 | $37.00 | $39.60 |
| Salvage (s) | $4.50 | $6.60 | $8.60 | $10.50 | $12.30 | $14.00 | $15.60 | $17.10 | $18.50 | $19.80 |
| Demand mean | 400 | 400 | 300 | 300 | 250 | 250 | 200 | 200 | 200 | 200 |
| Demand Stdev | 40 | 50 | 45 | 53 | 50 | 56 | 50 | 55 | 60 | 65 |
| Optimal_quantity | 364 | 360 | 269 | 269 | 225 | 226 | 182 | 184 | 187 | 190 |
| Mean_profit | $12,043 | | | | | | | | | |
| Stdev_profit | $3,525 | | | | | | | | | |
| CV_profit | 29.27% | | | | | | | | | |

| | sample size 30 | | | | Demand | | | | | |
|---|---|---|---|---|---|---|---|---|---|---|
| Total Demand | Sample | 1 | 2 | 3 | 4 | 5 | 6 | 7 | 8 | 9 | 10 |
| 3,213 | 1 | 0 | 7 | 0 | 495 | 0 | 1,679 | 0 | 0 | 0 | 1,032 |
| 7,438 | 2 | 0 | 164 | 0 | 127 | 368 | 0 | 0 | 1,066 | 1,559 | 4,154 |
| 4,142 | 3 | 0 | 194 | 0 | 0 | 0 | 698 | 0 | 76 | 0 | 3,175 |
| 2,028 | 4 | 0 | 0 | 0 | 342 | 0 | 1,465 | 0 | 221 | 0 | 0 |
| 2,441 | 5 | 0 | 0 | 0 | 0 | 301 | 0 | 1,624 | 0 | 516 | 0 |
| 1,942 | 6 | 0 | 0 | 0 | 0 | 0 | 0 | 0 | 89 | 1,720 | 134 |
| 4,302 | 7 | 0 | 0 | 0 | 293 | 0 | 2,497 | 0 | 0 | 1,512 | 0 |
| 210 | 8 | 0 | 0 | 0 | 6 | 0 | 204 | 0 | 0 | 0 | 0 |
| 348 | 9 | 0 | 0 | 0 | 87 | 0 | 0 | 0 | 261 | 0 | 0 |
| 754 | 10 | 0 | 205 | 0 | 169 | 379 | 0 | 0 | 0 | 0 | 0 |
| 4,286 | 11 | 0 | 607 | 0 | 484 | 531 | 0 | 0 | 0 | 0 | 2,666 |
| 2,390 | 12 | 0 | 0 | 0 | 0 | 0 | 0 | 1,721 | 669 | 0 | 0 |
| 1,784 | 13 | 0 | 0 | 0 | 0 | 0 | 0 | 0 | 0 | 1,784 | 0 |
| 4,180 | 14 | 0 | 0 | 0 | 258 | 0 | 1,117 | 150 | 0 | 2,656 | 0 |
| 4,278 | 15 | 0 | 0 | 0 | 0 | 0 | 0 | 1,106 | 2,185 | 988 | 0 |
| 8,297 | 16 | 0 | 0 | 0 | 0 | 0 | 0 | 1,888 | 1,923 | 1,744 | 2,742 |
| 4,395 | 17 | 0 | 0 | 0 | 0 | 0 | 0 | 1,635 | 229 | 369 | 2,163 |
| 1,618 | 18 | 0 | 424 | 0 | 0 | 0 | 0 | 1,124 | 0 | 69 | 0 |
| 3,625 | 19 | 0 | 205 | 103 | 0 | 0 | 0 | 538 | 904 | 0 | 1,874 |
| 2,282 | 20 | 0 | 165 | 0 | 478 | 0 | 0 | 0 | 0 | 1,639 | 0 |
| 2,705 | 21 | 0 | 0 | 0 | 0 | 0 | 0 | 0 | 0 | 987 | 1,718 |
| 4,856 | 22 | 0 | 0 | 0 | 505 | 656 | 1,159 | 886 | 0 | 355 | 1,295 |
| 4,954 | 23 | 0 | 0 | 76 | 343 | 125 | 684 | 0 | 202 | 0 | 3,525 |
| 552 | 24 | 0 | 133 | 0 | 420 | 0 | 0 | 0 | 0 | 0 | 0 |
| 1,571 | 25 | 0 | 0 | 0 | 0 | 0 | 0 | 0 | 0 | 1,318 | 253 |
| 448 | 26 | 0 | 0 | 169 | 279 | 0 | 0 | 0 | 0 | 0 | 0 |
| 2,411 | 27 | 0 | 94 | 0 | 0 | 352 | 300 | 0 | 0 | 1,665 | 0 |
| 4,294 | 28 | 168 | 0 | 0 | 629 | 0 | 1,499 | 0 | 1,141 | 856 | 0 |
| 860 | 29 | 0 | 0 | 0 | 0 | 0 | 0 | 0 | 860 | 0 | 0 |
| 1,222 | 30 | 0 | 0 | 0 | 0 | 0 | 0 | 0 | 0 | 1,222 | 0 |

Implementation

This method can be implemented for all problems mentioned above (see Problems 2, 2.a,b,c, 5) or similar versions not specifically mentioned here. A computer system illustrated in FIG. 1 or a similar system can be used to implement this methodology. In the specific system illustrated, a server 101 serves as the hub of a computer system that includes clients $102_1$ to $102_6$ connected via an intranet 103, wireless clients $104_1$ to $104_4$, and multiple other clients of various types $105_1$ to $105_5$ connected via the Internet 106. The server 101 is also connected to a storage system 107 which provides storage for the computer system.

Figure 2:
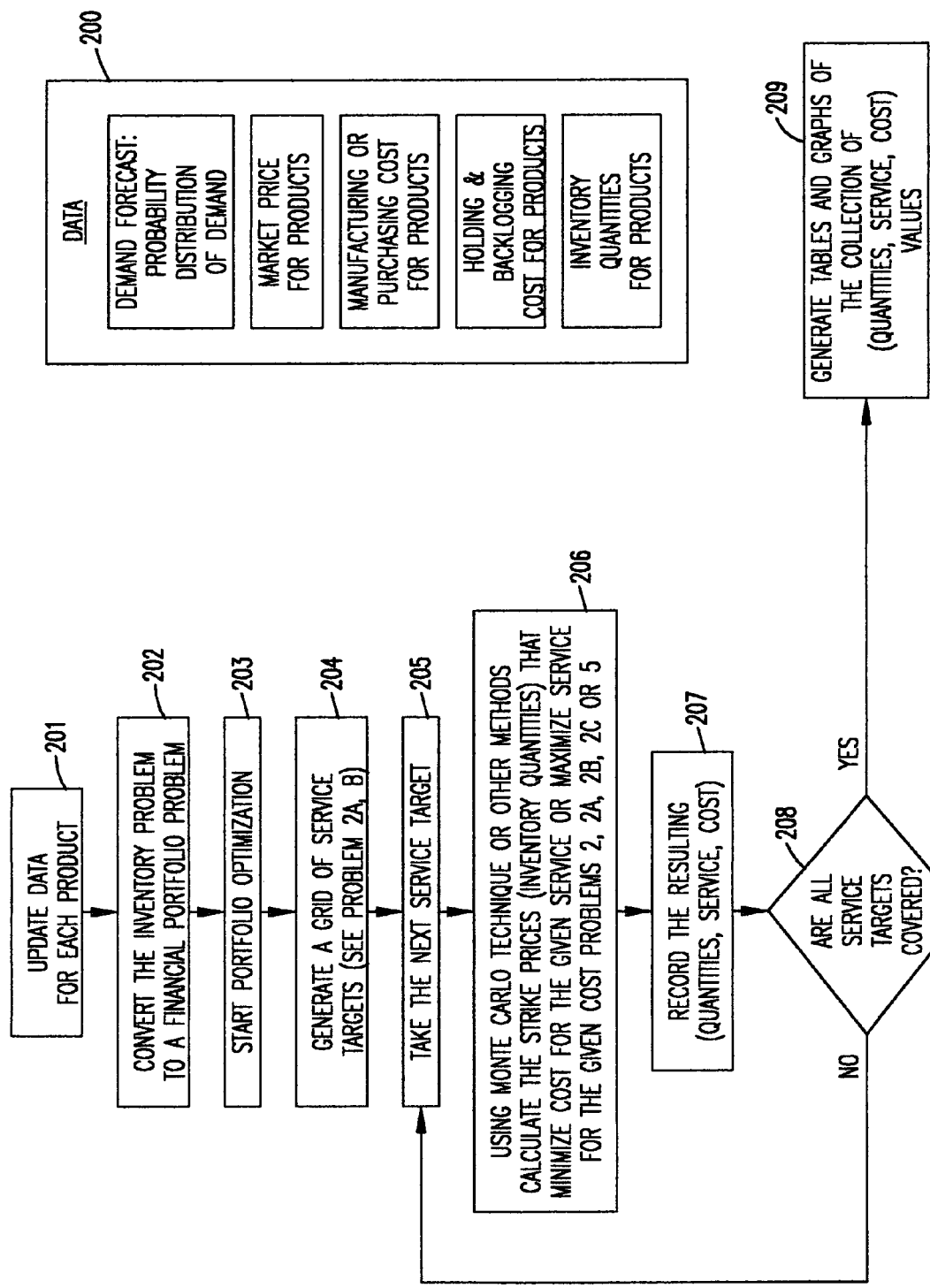
FIG. 2 is a flow diagram showing the process of calculating optimal inventory for a cost minimization problem with service constraints.

FIG. 2 shows a flow diagram that can be used as a general approach to solve such problems. The data 200 (stored for example in storage system 107) includes
 demand forecast: probability distribution of demand
 market price for products
 manufacturing or purchasing cost for products
 holding and backlogging cost for products
 inventory quantities for products The process begins by updating the data for each product in function block 201. Then, the inventory problem is converted to a financial portfolio problem in function block 202. Portfolio optimization is started in function block 203. A grid of service targets (as set out in Problems 2.a, 2.b) is generated in function block 204. A processing loop is then entered which begins with function block 205 where the next service target is accessed. In function block 206, Monte Carlo technique or other methods are used to calculate the strike prices (inventory quantities) that minimize cost for the given service or maximize service for the given Problems 2, 2.a, 2.b, 2.c, or 5. The results (quantities, service, cost) are recorded in function block 207. A determination is made in decision block 208 as to whether all service targets have been covered. If not, the process loops back to function block 205 to access the next service target. When all service targets are serviced, tables and graphs of the collection of calculated values (quantities, service, cost) is generated in function block 209.

While the invention has been described in terms of a single preferred embodiment, those skilled in the art will recognize that the invention can be practiced with modification within the spirit and scope of the appended claims.

The invention claimed is:

1. A method for managing inventory using a computer or computer system comprising the steps of:
   converting an inventory problem to financial portfolio problem;
   generating a set of possible inventory investments;
   computing a value of possible inventory investments with said computer of computer system; and
   selecting an inventory investment with a best value.

2. The method for managing inventory of claim 1, wherein the step of converting the inventory problem into a financial portfolio problem expresses the inventory problem as a combination of long and short positions and put and call options on an asset.

3. The method for managing inventory of claim 2, wherein the value of possible inventory investments is computed by the steps of:
   decomposing cash flows associated with the inventory investment into a combination of cash flows that can be represented by a portfolio comprised of long and short positions in an underlying asset;
   computing with a valuation methodology the value of each long and short position in the portfolio;
   summing values of each long and short position in the portfolio to determine a value of the portfolio; and
   setting the value of the inventory investment equal to the value of the portfolio.

4. The method for managing inventory of claim 3, wherein the valuation methodology comprises one or more of a cash flow analysis, an option valuation analysis, a derivatives pricing analysis, variance reduction procedures, and finite difference methods.

5. The method for managing inventory of claim 3, wherein a value of an underlying asset of the portfolio is a demand for the inventory.

6. The method for managing inventory of claim 1, wherein operations research techniques are used to compute an inventory investment with a best value.

7. The method for managing inventory of claim 1, wherein an inventory investment with a best value is a highest expected value.

8. The method for managing inventory of claim 1, wherein inventory is selected using one of optimization, simulation, dynamic programming, heuristics, rule-based systems, and a budget constraint.

9. The method for managing inventory of claim 1, wherein the step of computing a value of possible inventory investments is based on one or more of demand variability, risk free interest rate, current level of demand, and historical level of demand.

10. A computer system for managing inventory comprising a plurality of clients connected to a common server and a storage system connected to the server, the storage system storing demand forecast, market price for products, manufacturing or purchasing cost for products, holding and backlogging cost for products, and inventory quantities for products, the server receiving inputs from the clients and converting an inventory problem to a financial portfolio problem, the server further generating a set of possible inventory investments, computing a value of possible inventory investments, and selecting an inventory investment with a best value.

11. The computer system for managing inventory of claim 10, wherein the server converts the inventory problem into a financial portfolio problem by expressing the inventory problem as a combination of long and short positions and put and call options on an asset.

12. The computer system for managing inventory of claim 11, wherein the server computes the value of possible inventory investments by decomposing cash flows associated with the inventory investment into a combination of cash flows that can be represented by a portfolio comprised of long and short positions in an underlying asset, computing with a valuation methodology the value of each long and short position in the portfolio, summing values of each long and short position in the portfolio to determine a value of the portfolio, and setting the value of the inventory investment equal to the value of the portfolio.

* * * * *